United States Patent
Harms et al.

(10) Patent No.: US 11,113,398 B2
(45) Date of Patent: *Sep. 7, 2021

(54) DEPLOYMENT OF MACHINE LEARNING MODELS FOR DISCERNMENT OF THREATS

(71) Applicant: Cylance Inc., Irvine, CA (US)

(72) Inventors: Kristopher William Harms, Kailua, HI (US); Renee Song, Irvine, CA (US); Raj Rajamani, Irvine, CA (US); Braden Rusell, Ladera Ranch, CA (US); Yoojin Sohn, Irvine, CA (US); Kiefer Ipsen, Irvine, CA (US)

(73) Assignee: Cylance Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,529

(22) Filed: Mar. 9, 2020

(65) Prior Publication Data

US 2020/0210582 A1 Jul. 2, 2020

Related U.S. Application Data

(63) Continuation of application No. 16/425,662, filed on May 29, 2019, now Pat. No. 10,657,258, which is a
(Continued)

(51) Int. Cl.
*G06F 21/56* (2013.01)
*G06N 20/00* (2019.01)
(Continued)

(52) U.S. Cl.
CPC ............ *G06F 21/568* (2013.01); *G06F 21/51* (2013.01); *G06F 21/562* (2013.01);
(Continued)

(58) Field of Classification Search
CPC ...... G06F 21/568; G06F 21/51; G06F 21/562; G06F 21/566; G06F 2221/033;
(Continued)

(56) References Cited

U.S. PATENT DOCUMENTS 9,690,933 B1 * 6/2017 Singh ..................... G06N 5/045
9,800,590 B1 * 10/2017 Gates .................. H04L 63/1408
(Continued)

FOREIGN PATENT DOCUMENTS

| EP | 3469777 A1 | 4/2019 |
| WO | 2016/182668 A1 | 11/2016 |
| WO | 2017/0214131 A1 | 12/2017 |

OTHER PUBLICATIONS

Non-Final Office Action issued for U.S. Appl. No. 15/615,609, dated May 3, 2019.
(Continued)

*Primary Examiner* — J. Brant Murphy
(74) *Attorney, Agent, or Firm* — Jones Day (57) ABSTRACT

A mismatch between model-based classifications produced by a first version of a machine learning threat discernment model and a second version of a machine learning threat discernment model for a file is detected. The mismatch is analyzed to determine appropriate handling for the file, and taking an action based on the analyzing. The analyzing includes comparing a human-generated classification status for a file, a first model version status that reflects classification by the first version of the machine learning threat discernment model, and a second model version status that reflects classification by the second version of the machine learning threat discernment model. The analyzing can also include allowing the human-generated classification status to dominate when it is available.

20 Claims, 6 Drawing Sheets

Related U.S. Application Data continuation of application No. 15/615,609, filed on Jun. 6, 2017, now Pat. No. 10,372,913.

(60) Provisional application No. 62/347,428, filed on Jun. 8, 2016.

(51) Int. Cl.
   *G06F 21/51* (2013.01)
   *H04L 29/06* (2006.01)
   *G06F 3/048* (2013.01)

(52) U.S. Cl.
   CPC .......... *G06F 21/566* (2013.01); *G06N 20/00* (2019.01); *H04L 63/1425* (2013.01); *H04L 63/1441* (2013.01); *G06F 3/048* (2013.01); *G06F 2221/033* (2013.01)

(58) Field of Classification Search
   CPC ..... G06F 3/048; G06N 20/00; H04L 63/1425; H04L 63/1441

See application file for complete search history.

(56) References Cited

U.S. PATENT DOCUMENTS

| | | | |
|---|---|---|---|
| 2010/0205123 A1* | 8/2010 | Sculley | G06F 21/562 706/12 |
| 2014/0237622 A1* | 8/2014 | Chang | G06F 21/604 726/27 |
| 2015/0227741 A1* | 8/2015 | Permeh | G06F 21/52 726/22 |
| 2016/0337390 A1* | 11/2016 | Sridhara | H04W 12/1208 |
| 2017/0223036 A1* | 8/2017 | Muddu | H04L 63/20 |

OTHER PUBLICATIONS

Non-Final Office Action issued for U.S. Appl. No. 16/425,662, dated Oct. 3, 2019.
Final Office Action issued for U.S. Appl. No. 16/425,662, dated Dec. 19, 2019.
International Search Report and Written Opinion issued for International Application No. PCT/US2017/036134, dated Aug. 9, 2017 (17 pages).
Lam et al., "Classifier Combinations: Implementations and Theoretical Issues," Electronic Publishing, Artistic Imaging, and Digital Typography, 1857: 77-86 (2000).
Communication pursuant to Rules 161(1) and 162 EPC issued for European Application No. 17731375.6, dated Jan. 19, 2018 (3 pages).

* cited by examiner

| Classification | Production Status | New Status | What needs to be done |
|---|---|---|---|
| Trusted | * | Safe | No action |
| PUP or Malware | * | Unsafe | No action |
| File Unavailable | Safe | Unsafe | Safelist or provide file for threat analytics |
| File Unavailable | Unsafe | Safe | Add to GQT list |
| <Empty> | N/A | Unsafe | Analyze locally or wait for classification to become available |

FIG. 4

| OLD MODEL CLASSIFICATION | STATE OF SAMPLE ON DEVICE | NEW MODEL CLASSIFICATION | TREATMENT |
|---|---|---|---|
| Safe | | Unsafe | Abnormal |
| | | Abnormal | Abnormal |
| Unsafe | GQT or QT | Safe or Abnormal | Abnormal |
| Unsafe | SL or Waived | Safe | Goes away from Venue. |
| Unsafe | SL or waived | Abnormal | Abnormal; waiver remains in place |
| Abnormal | GQT or QT | Safe | Abnormal |
| Abnormal | SL or Waived | Safe | Goes away from venue |
| Abnormal | | Unsafe | Unsafe |

DEPLOYMENT OF MACHINE LEARNING MODELS FOR DISCERNMENT OF THREATS

CROSS-REFERENCE TO RELATED APPLICATIONS

This application is a continuation under 35 U.S.C. § 120 of U.S. patent application Ser. No. 16/425,662, filed on May 29, 2019, which in turn, is a continuation under 35 U.S.C. § 120 of U.S. patent application Ser. No. 15/615,609, filed on Jun. 6, 2017, which claims priority to U.S. Provisional Application No. 62/347,428, filed on Jun. 8, 2016, the contents of each of which are hereby fully incorporated by reference.

TECHNICAL FIELD

The subject matter described herein relates to the use of machine learning models for the discernment of threats (e.g. malware, viruses, improper or unauthorized access or execution of files or data, or the like).

BACKGROUND

Computer-implemented models can be used to efficiently execute classifications and similarity analysis using probabilistic models generated through the principles of machine learning. Such models can be used in the field of computer security to evaluate threats (e.g. for malware and virus detection and/or avoidance). In some examples, these models can be generated in an automated manner via use of generative models in which samples further train the system and result in iteratively better models that correctly represent the best predictive capabilities expressed within a particular sample population.

In the context of computer security, discernment refers to the characterization of whether or not to allow a particular application, application module, other executable code, etc. to execute on a particular computing system or systems. In other examples, discernment may refer to identifying whether or not to allow a file to be downloaded to or opened by a particular computing system or systems, or more generally to whether or not to allow a given action by a file or program to be initiated or to be continued after being initiated.

SUMMARY

The current subject matter relates to approaches for allowing computers to efficiently determine if they should run a program, open or download a file, etc. based on an immediate (i.e., real-time, etc.) analysis of the program or file. This approach can, consistent with some implementations, leverage highly trained machine learning algorithms to create a real-time discernment on a combination of static and dynamic features collected from the program, the computer's current environment, and external factors. In some aspects of the current subject matter, mismatches between assessments of a level of risk or threat associated with a file, program, action, etc. that are generated by two different versions of a machine learning threat discernment model may be determined to disagree or otherwise include a mismatch in how the level of threat or risk is assessed or classified by the two models. The mismatch can be analyzed based on various factors, and one or more actions can be taken in response to the analysis results to provide one or more advantages, which may optionally include minimizing disruption to user operations.

In one aspect, a method implemented on one or more computing systems that include one or more programmable processors includes detecting a mismatch between model-based classifications produced by a first version of a machine learning threat discernment model and a second version of a machine learning threat discernment model for a file, analyzing the mismatch to determine appropriate handling for the file, and taking an action based on the analyzing. The analyzing includes comparing a human-generated classification status for a file, a first model version status that reflects classification by the first version of the machine learning threat discernment model, and a second model version status that reflects classification by the second version of the machine learning threat discernment model. The analyzing can also include allowing the human-generated classification status to dominate when it is available.

In some variations, one or more of the following features can be included in any feasible combination. For example, when the file is deemed safe by the first model version but unsafe by the second model version, and when the human-generated classification is unavailable for the file, the file can be presented via user interface functionality of an administrative interface (i.e., a web-browser based interface, an administrative portal, etc.) with a choice of creating a new human-generated classification of the file as safe or allowing the second model version classification to govern. Alternatively or in addition, when the human-generated classification is unavailable for the file, a file deemed unsafe by the first version of the machine learning threat discernment model but safe by the second version of the machine learning threat discernment model can be quarantined. Alternatively or in addition, when the file is deemed unsafe by the second model version and the human human-generated classification is unavailable and when the first model version has not previously classified the file, the file can be presented via the user interface functionality of the administrative interface with a second choice of designating the file for local analysis and/or allowing the second model version classification to continue to block use of the file until the human-generated classification becomes available. In some variations, the action can include executing or otherwise accessing code that generated the respective threat scores without quarantining if a difference in the threat scores is below a pre-defined threshold.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning approach in which cloud-based (or otherwise networked) instances of machine learning models are deployed in conjunction with instances of one or more machine learning models or groups of machine learning models (ensembles) deployed at one or more computer endpoints, it should be readily understood that such features are not necessarily intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Detection solutions that rely solely on signatures, filters, heuristics, behavior, white lists, safe lists, black lists, policy management, and the like, which can be referred to generally as human-generated classifications, may not be able to keep pace with a rapidly changing threat landscape in computing environments. In particular, advanced threats such as those that use "exploits and evasion" tactics to expose the most prolific and vulnerable access points into any environment have quickly become apparent as significant threats to traditional defenses, particularly to endpoint computers (e.g. individual user machines). Hackers and attackers use malware, but often also or alternatively employ all kinds of access rights, rootkits, and other binaries naturally resident on the endpoint that, while legitimate, may be used for bad purposes. A cloud based, non-signature, non-heuristic and non-behavioral engine that detects and blocks these attacks through advanced mathematical analysis and machine learning of actions and attributes to identify good from bad and allow users of computing endpoints protected by one or more machine learning threat discernment model to work without overbearing restrictions can be desirable.

As used herein, and unless otherwise defined more specifically for a described use case or example, the term "threat" is intended to refer broadly to actions, files, programs, downloadable data, and other computer-implemented threats that have a potential to cause unwanted interference, damage, delay, breaches, or the like to the computing systems and/or security of one or more computing systems. The term file is also used broadly herein, unless otherwise indicated explicitly or by use in context, to refer to any of files, programs (executable or otherwise) or the like; actions taken by files, external systems, or the like; transmissions of data in any form to or from a computing system; etc.

Figure 1:
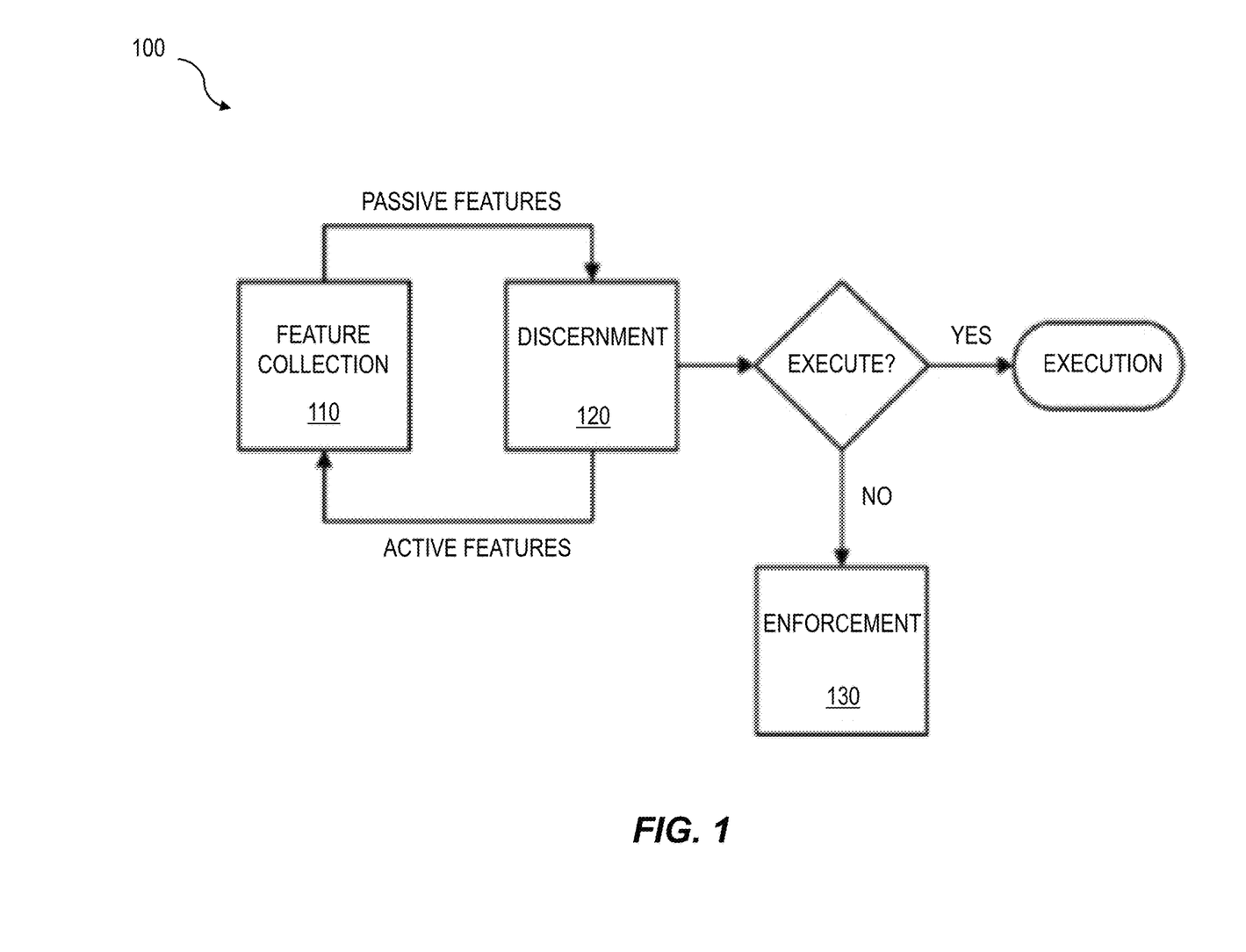
FIG. 1 shows a diagram illustrating features of a machine learning approach for threat discernment in computing environments.

FIG. 1 shows a diagram illustrating an example of software elements that can be included in a machine learning model for use in a discernment application. A feature collection module 110 (sometimes referred to as a feature collector), a discernment module 120, and an enforcement module 130 can interact to learn from one or more samples and to provide predictive outputs regarding the likelihood of a given file being a threat. As used herein, the term module refers to software functionality that can be implemented via one or more programmable processors that are part of one or more computing systems. The feature collection module 110 collects or otherwise accesses features characterizing a program and/or the environment in which the program is being executed or to be executed. A feature refers to any salient data point that can be measured from a sample. A model can be a single or multi-model probability matrix that defines the likelihood of any sample to be classified in a particular class. Consistent with the current subject matter, machine learning models can implemented as both one or more cloud-based instances and one or more locally running instances (e.g. at one or more endpoint computers of an organization).

Features collected and/or accessed by the feature collection module 110 are passed on to the discernment module 120, which can make a decision on whether or not to allow the program to execute (or a file to be downloaded, opened, etc.). If it is determined that the program should not execute or some other action with a file to be prevented, the enforcement module 130 can take action to prevent the application, file, code fragment, etc. from executing, opening, continuing to execute, being downloaded, etc. In some implementations of the current subject matter, the enforcement module 130 can require quarantining of a file or the like that is assessed as a potential threat.

A machine learning threat discernment model or an ensemble of machine learning threat discernment models can be devised and trained before application control. Due to the predictive nature of various machine learning algorithms, a trained model allows a "fuzzy" match against safe and unsafe programs. As used herein, the terms "safe" and "unsafe" generally refer to a machine-generated, relative classification based on an estimate of the danger presented by one or more files that could be a threat. A machine learning threat discernment model as described herein can output a threat score for a given file, program, action, etc., and the threat score can be used to classify the file, program, action, etc. as safe or unsafe. Other classification protocols with more than two divisions are also within the scope of the current subject matter. In non-limiting examples, threat score outputs from one or more machine learning threat discernment models can be used to classify potential threats in three categories (e.g. safe, suspect, unsafe or similar labels), four categories (e.g. safe, suspect but likely safe, suspect but likely unsafe, and unsafe or similar labels), or more than four categories.

By carefully selecting and training the machine learning threat discernment models in an ensemble of such models, a threat discernment system can act resiliently against change over time, accommodating small and large changes in program behaviors that resemble "safety" or a lack thereof. Machine learning threat discernment models may be characterized by one or more algorithms incorporated therein, which may include, as illustrative examples, neural networks, support vector machines, logistic regressions, scorecard models, Bayesian algorithms, and decision trees. A machine learning threat discernment model can be trained using supervised learning, in which a training set of input samples labeled with the desired output values conditions the model to correctly classify samples that do not occur in the training set, or it may be trained using unsupervised learning, in which an algorithm identifies hidden structure in unlabeled data. Reinforcement learning represents a third process for training a machine learning threat discernment model.

As noted above, machine learning threat discernment models such as those described herein can, in some examples, provide a risk or threat score as an output based on analysis of a given file. This score, and/or a classification based on such a score can be used to determine whether the file allowed to proceed without restriction or is instead flagged as a potential threat. In addition to the machine learning model score, individual organizations may make use of safe lists, black lists, and other existing, human-generated classification approaches to threat detection and interdiction. For example, referring back again to the diagram 100 of FIG. 1, a feature collector module 110 can send passive features (operational and dynamic) on an ongoing basis to a discernment module 120. The discernment module 120 can request point in time features from the feature collector module 110 at a particular decision point, such as execution of a file (e.g. a program). These point-in-time features can include observations about the computer's state extrinsic to the file or related features from an external source. The discernment module 120 can then decide if a file should execute or if other actions (e.g. opening or downloading a file, transmitting or receiving data, etc.) are allowed to begin or proceed. If execution/opening/downloading is allowed based on the decision of the discernment module about a file, a program executes or a file is opened or downloaded, or other actions related to the file can occur. If an action is disallowed, an enforcement module 130 can prevent it from occurring.

As used herein, a sample refers to any piece of data upon which classifying or similarity analysis operations against similar samples can be performed. A multiclass classifier refers to a classifier that can support classification in two or more classes. A multi-model classifier refers to a classifier that uses sub models to handle particular intricacies in a complex sample. A generative classifier refers to a classifier in which samples used to classify may become training material for future analysis.

As noted above, machine learning approaches can be applied both locally (e.g. at one or more computer endpoints) and via a networked (e.g. cloud-based) service in which suspect files or programs are analyzed by models implemented on one or more servers or other computers. In some implementations, both a local version (e.g. executing on an endpoint machine) of a model, multiple versions of a local version, and a cloud-based version of the model may handle discernment tasks. The local model can provide endpoint detection that does not rely on the presence of a network connection and that does not require transmission of information about a suspected threat to servers running the cloud-based version of the model. When two or more local versions are deployed on a single endpoint, they can be configured independently to enforce different actions based on the threat score of each model. The cloud-based version can be more readily updated with improvements in the machine learning and other features that may lead to better discernment of threats. Additionally, a cloud-based model can learn from inputs received from multiple endpoints and may therefore be better at adapting to new types of threats. As such, a given suspected threat may be analyzed by both a cloud-based version of a machine learning model and one or more local versions of a machine learning model (e.g., the new model can be a secondary model on the endpoint in some variations). Because the cloud-based model generally has access to more updated information as well as a greater pool of training inputs, in cases where a cloud-based model and a locally running model disagree, the typical approach is to let the scoring of a file, program, activity, etc. produced by the cloud-based model govern the final score given to the file, program, activity, etc. (which are generically referred to herein as "samples"). Additionally, when more than one local model is deployed on an endpoint, one version can be considered the primary model, and others considered secondary.

While cooperative use of locally running (e.g. one or more models at one or more computer endpoints) and cloud-based or secondary endpoint (or otherwise networked) instances of machine learning models for discernment of threats in computing environments can provide a more robust discernment approach, this arrangement can also create the possibility of mismatches between the versions of two models being used to analyze a given sample. For example, when a new version of a model is released, it is possible that the newer model (cloud based or deployed as a secondary local model) and the primary local version at a given endpoint may not be consistent. For example, an administrator at an organization may not roll out the new version of a model to endpoint computers under his/her control until after adequate testing of the model with the organization's current configurations of software, hardware, etc. can be tested, while the updated version of the model (which may generally be administered by a vendor of a protection/discernment software product and/or service) may be immediately updated to the newer version.

A mismatch in versions of a machine learning model used for discernment between a new version of the machine learning model and a locally deployed and older version at one or more computer endpoints may lead to different scoring of potential threats. More generically, the current subject matter can apply to any mismatch in scoring or classification of a file based on differences in a first version and a second version of a machine learning threat discernment model. Because machine learning threat discernment models are progressively trained and rely on a number of complex and interrelated variables, they are not simple table or data files that can be characterized as a "delta" from one version to another (unlike signature files or other data structures conventionally used in evaluating whether files or programs are safe or unsafe). It may not be readily apparent what has changed from one version of a model to another, and it is possible that a same file could have a different threat score or otherwise be classified differently (e.g. with a different decision point regarding safe, suspect, unsafe, etc.) to open, execute, download, etc. Such discontinuities can lead to issues that may disrupt normal worker efficiency. For example, files or programs or actions that were deemed safe under a previous version of the model and that are identified as unsafe by the newer version of the model may be barred from operating normally. In an example in which both the first model version and the second version (cloud-based or locally deployed) model score a file, a mismatch in model scores or in a threat level classification can also lead to uncertainty, interruptions in workflows that were previously considered safe, etc.

Other issues can arise in which administrators of one or more computer endpoints maintain safe lists, black lists, quarantine rules, other human-generated classifications, etc. that identify specific programs or files as always safe, never safe, questionable, etc. These human-generated classifications generally do not change with updating of a model version. There are circumstances in which a model score or other model-based classification for a given sample or set of features in a sample may change between two versions of the machine learning threat discernment model. In some examples, this change in score can result in a model-based classification (e.g. safe, abnormal, suspect, potentially unwanted, unsafe, etc.) changing, in either direction, as a result of a change from one (e.g. a first) machine learning threat discernment model version to another (e.g. a second) machine learning threat discernment model version. Accordingly, a given file can have its model classification change from (for example) safe to unsafe, unsafe to abnormal (e.g. suspect), etc. or between any two of multiple classification categories indicating a relative threat level of the file while its human-generated classification remains as established in one or more lists or rules established by the administrator(s) of the endpoint computer(s).

In general, human-generated classifications such as safe-listing, blacklisting, whitelisting, quarantining, etc. by administrators or other authorized users can occur via use of a hash or certificate of the like. An administrator can may also globally quarantine (e.g. across all endpoints) known "bad" hashes in accordance with alerts received from various threat intelligence services (e.g. malware advisories, etc.). These manual overrides have an impact on performance. Implementations of the current subject matter can enable automatic clean up of safelists, blacklists, waivers, and other human-generated classifications that are no longer necessary (e.g. when a new model version is applied and the new model version agrees with the classification established by a human-generated classification). Because of version fragmentation (e.g. not all endpoints may be implementing a same model version at any given time), removal of human-generated classifications is generally not necessarily straightforward.

To allow implementation of features described herein, discernment management functionality can be configured to ascertain which version of a model the agent software at an endpoint computer is using and to select a "correct" scoring outcome based on any mismatches that may arise between scoring results generated by a local version of the model executing on the endpoint computer and a cloud-based version of the model. In some implementations of the current subject matter, a cloud-based service can concurrently support multiple versions of a machine learning model configured to discern threat levels for files. In other implementations, the local endpoint can run two models simultaneously, with varying enforcement applied to each.

Model updates may be coordinated with releases of "agent" software that runs on endpoint computers to implement execution of the local version of a machine learning threat discernment model. In general, however, administrators may prefer to not have to implement frequent updates of the agent software on computer endpoints. Accordingly, implementations of the current subject matter can decouple updates to a machine learning threat discernment model version from updates to the agent software such that a new or secondary model version is always pushed down to the agent software running on computing endpoints. As model updates can be characterized as merely "data" rather than updates to an executable file, such updates can bypass change control/window.

Model-based classification (e.g. unsafe, abnormal, suspect, safe, etc.) may in some examples be generally determined solely based on a model-generated threat score. However, a user of a model-based discernment system (e.g. the local system administrator or administrators) may choose to manually classify certain files to further enhance usability as noted above. For example, certain files, programs, activities, etc. used by an organization as part of its business activities may appear to a model to be classified as unsafe or suspect but instead actually be benign or necessary. An administrator may designate such files, programs, etc. as safe by adding them to a safe list (also referred to as a white list) or otherwise implementing some other form of human-generated classification. Similarly, an administrator may designate certain files that a model classifies as safe as always unsafe based on customized knowledge of his or her local computing environment and/or business needs. This can be done by adding the files to a black list or some other human-generated classification that blocks files from opening, executing, downloading, etc. Other types of files, programs, activities, etc. can be designated for quarantining via a manual classification set-up that overrides model classifications.

In one approach consistent with the current subject matter, an administrative interface or other user interface features can display classifications of a given file generated by multiple models when the model classification of a newer (e.g. more recently released) model version indicates that a file may be unsafe or otherwise pose a threat and when there is no human-generated classification (e.g. safelisted, whitelisted, waived, trusted, etc.) that overrides the classification by the new model version indicating that file is unsafe or otherwise poses a threat. In other implementations any change in the model classification of a file between a first and second model version can cause the multiple model classifications to be displayed an administrative interface.

Figure 2:
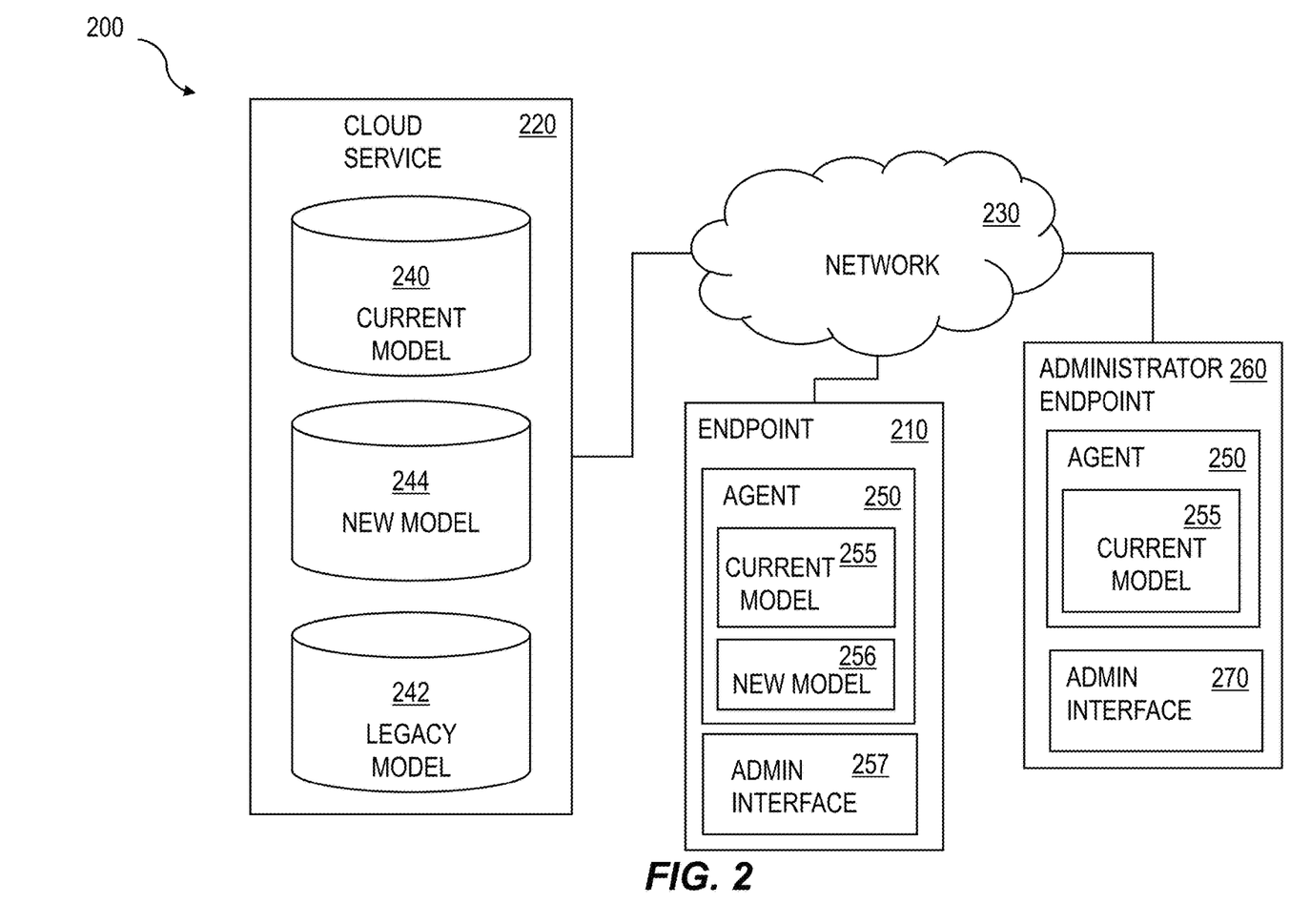
FIG. 2 shows a diagram illustrating aspects of a system having features consistent with implementations of the current subject matter.

FIG. 2 shows a computing arrangement 200 in which one or more endpoint computers 210 access a cloud-based implementation of a machine learning discernment model (e.g. executing on one or more server(s) as part of a cloud service 220) via a network 230, which can include the Internet or any other networked data communication pathways. The cloud service 220 can include a current version of the machine learning model 240 as well as additional versions of the model. In one example, and as shown in FIG. 2, the multiple models can include the current version 240, a most recent "legacy" version 242 (e.g. a version replaced by the current version), and a new version 244 that is not yet released but that will replace the current version 240. FIG. 2 also shows an options secondary local model 256 deployed on the endpoint 210. In certain configurations, the administrative interface 257 may also be available directly on the endpoint 210 itself.

The endpoint computers 210 can include agent software 250, which implements a local instance of the current model 255. An administrator endpoint 260 can include both the agent software 250 and an administrative interface 270. The administrative interface can include user interface functionality for displaying to an administrator the details of how different version of the model classify a given file, program, activity, etc. as well as information about any manual classifications. As noted above, in one example the administrative interface can enable viewing of classification results from three model versions. In other examples within the scope of the current subject matter, classifications from fewer (e.g. two) models can be displayed (e.g. current and most recent).

Consistent with implementations of the current subject matter, manually implemented decisions (e.g. those resulting from blacklisting, safe listing, quarantining, or other human-generated classifications) can be the default. In other words, model classifications can be forbidden from overriding human-generated classifications. However, an administrative interface can track and display background information regarding how a human-generated classification was derived.

Figure 3:
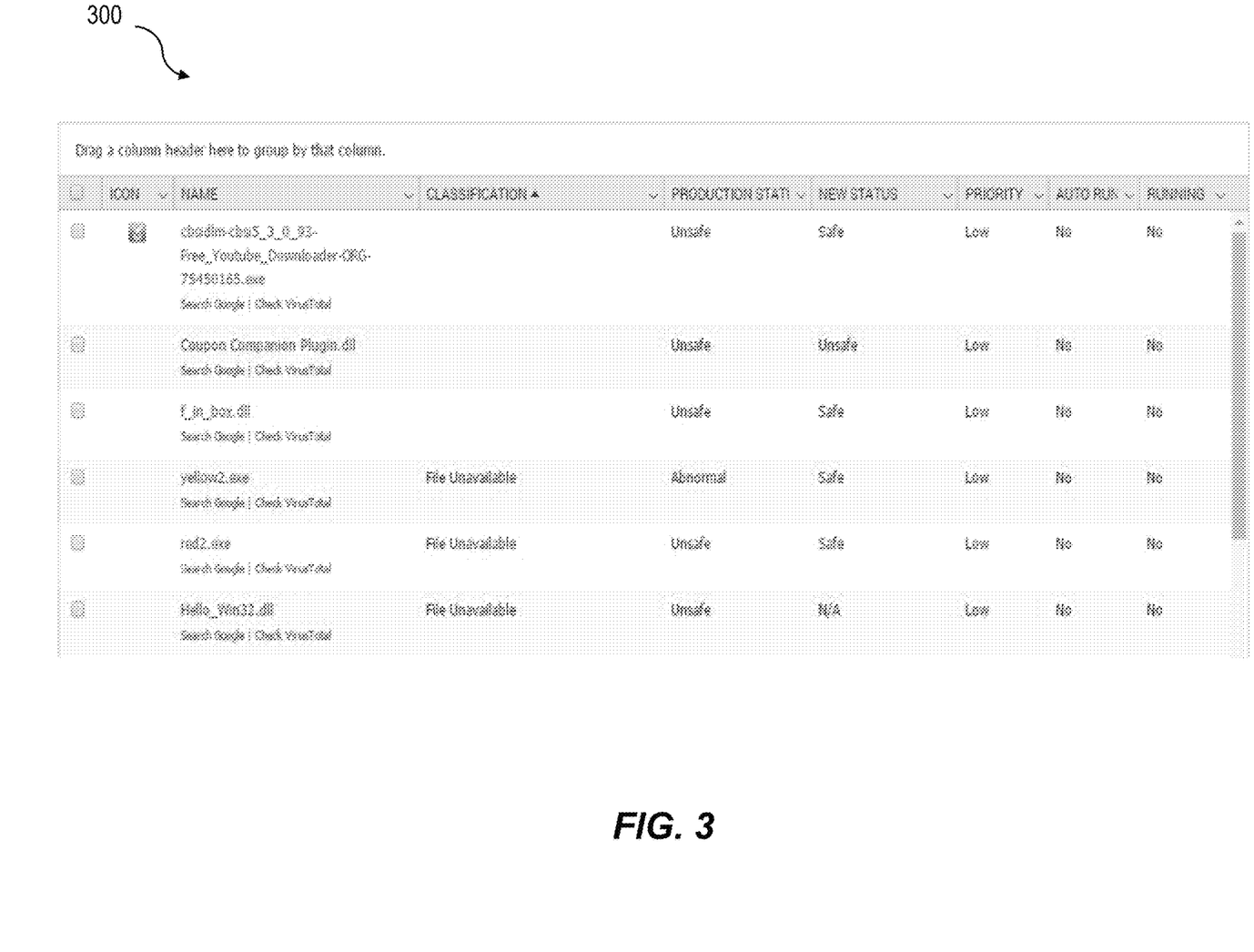
FIG. 3 shows a screenshot view illustrating user interface features consistent with implementations of the current subject matter.

As noted above, some implementations of the current subject matter include use of user interface features presented at computers usable by one or more system administrators responsible for one or more endpoint computers 210. These user interface features can be provided as part of an administrative interface 270. These user interface features can assist an administrator in identifying any deviations in how a production model and a new model classify a file. FIG. 3 shows an example administrative interface view 300 in which a "production status" column shows the status provided by the model used in an organization's production zone (e.g. endpoint computers that are used by normal users for day to day business activities). A "new status" column shows the status provided by a new model version. Using these two columns, along with "classification" and "detected by" columns, an administrator can investigate, triage and prioritize any changes in model classification that may occur. The "detected by" column shown in FIG. 3 can include information about which of multiple detection operations identified the file for evaluation by the model versions. For example, a "scan" function may review already running files. Potential threats identified by a scan can be highly prioritized due to this factor—an already executing program has the potential to cause significant harm. If "execution control" or "download control" detection operations or other functionality capable of preventing execution or downloading of a suspect file results in the detection of a file classified as a threat, this can be a less serious situation as the file has been prevented from executing or downloading as part of the detection. Other detection operations can include background scans and download watchers, which may detect suspect files classified as potential threats by a model version but which may never actually be executed. An administrator can use the "detected by" information to inform decisions about how to react to files classified by a new model version as a threat or as potentially suspect, etc.

Human-generated classification can be provided by one or more threat analysts or some other group of one or more trained experts who review/inspect one or more samples that are flagged by a model version as being suspect, unsafe, potentially a threat, etc. This approach can ensure that files that are classified via a human-generated classification as 'Trusted' (or safe, or the like) will not be blocked by model classification resulting from a new model version and that files that are classified via a human-generated classification as unsafe, potentially unwanted programs (PUP), malware, etc. will not be deemed safe by the new model. This approach can ensure that models continue to improve over time without introducing a new false negative or false positive for a known sample.

Figure 4:
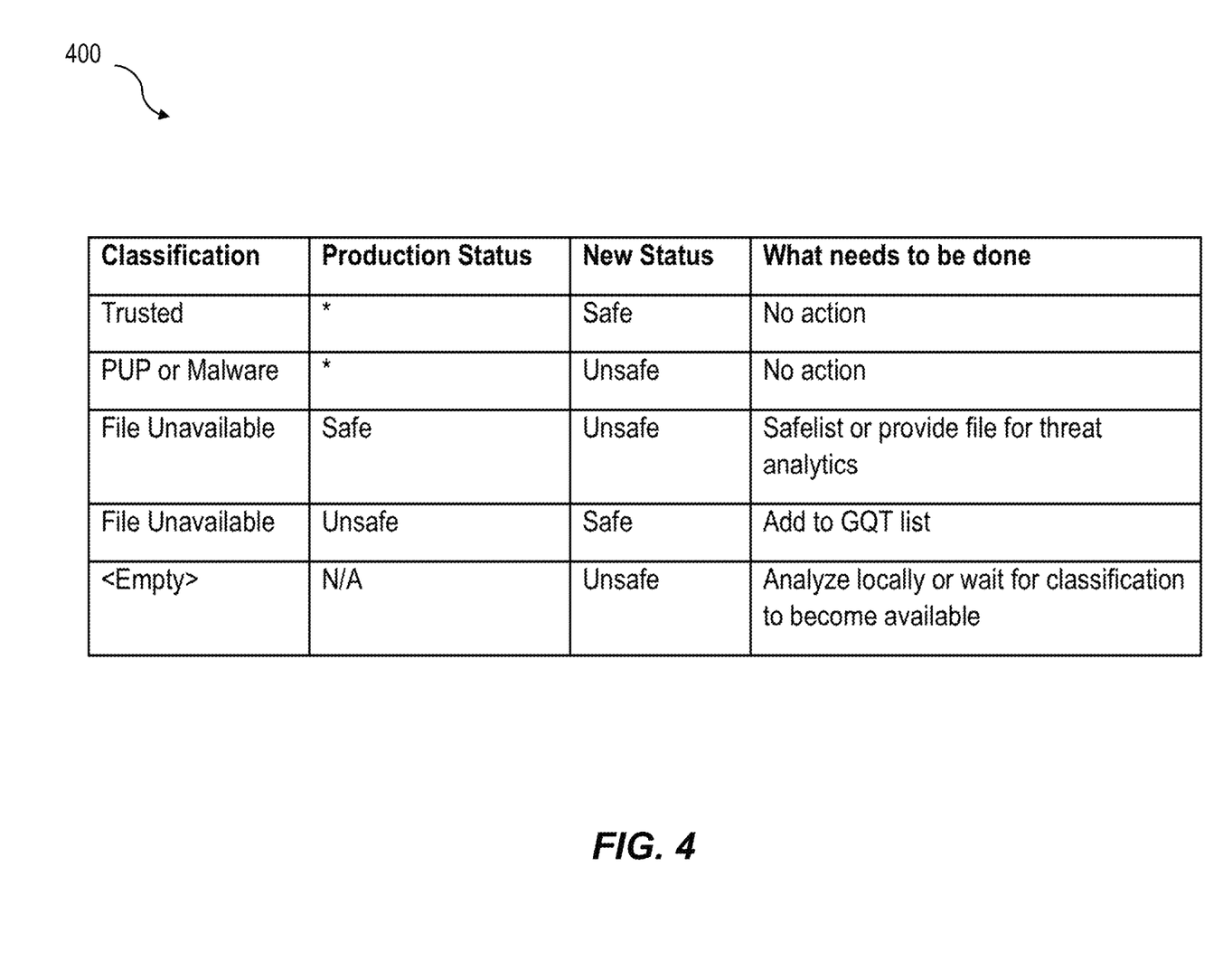
FIG. 4 shows a table illustrating features consistent with an implementation of the current subject matter.

FIG. 4 shows another table 400 further explaining features of an approach consistent with implementations of the current subject matter. The classification column lists possible statuses of a file (which, as noted above, broadly covers a range of programs, actins, data flows, etc.) with regard to a human-generated classification. The production status column lists possible model classifications that a current version of the model can produce, and the new status column lists possible model classifications that a newly implemented version of the model can produce. The final column (what needs to be done) indicates actions to take for a given file based on the status of the three inquiries. For example, files that are trusted or labeled as malware or PUP based on human-generated classification remain unchanged (regardless of the production status) if the new model classification is consistent with the manual classification. For files with unavailable classifications (for whatever reason) and a model mismatch between the production (current) and new model versions can be handled as indicated. A human-generated classification may not be available for a variety of reasons. For example, a customer (e.g. endpoint administrator) may turn off an auto-upload to avoid sharing proprietary applications or a sample may not yet have been processed by the one or more threat analysts.

Files that are safe according to the production model version but unsafe according to the new model version can be offered to an administrator for adding to a safelist or for referral to a threat analytics team. In other words, the administrator is presented with the option of adding a human-generated classification for such files if he or she knows them to be safe in contravention of the model classification resulting from the new model version. Files that were unsafe according to the production model version but safe according to the new model version can automatically be added to a global quarantine list such that further analysis can be performed without allowing a potentially unsafe file to cause damage. This approach can be used to ensure that a "false positive" in the new model version does not lead to potentially unsafe files being allowed to proceed unchecked. If no human-generated classification is available, the new model version considers the fail to be unsafe, and the production model had not previously encountered the file to create model classification, the file can be analyzed locally (while being blocked from execution due to the unsafe classification of the new model) or otherwise held until a human-generated classification becomes available.

In other words, what the operating approach illustrated in FIG. 4 can achieve is a deference to human classifying under conditions in which the new model and old model classification disagree and a usable approach to resolving conflicts or deviations such that unnecessary human-generated classifications such as safelisting, quarantining, waiving, etc. can be cleaned up. Deviations that require action are the ones for which the one or more threat analysts does not have a sample (e.g. because file upload is turned off) or the ones for which a classification is not yet available. Files for which the model classification mismatch goes from safe in the production model to unsafe or otherwise suspect in the new model are displayed in the administrative interface user interface for review by the administrator unless such files already had a human-generated classification in place, in which case the human-generated classification governs.

Figure 5:
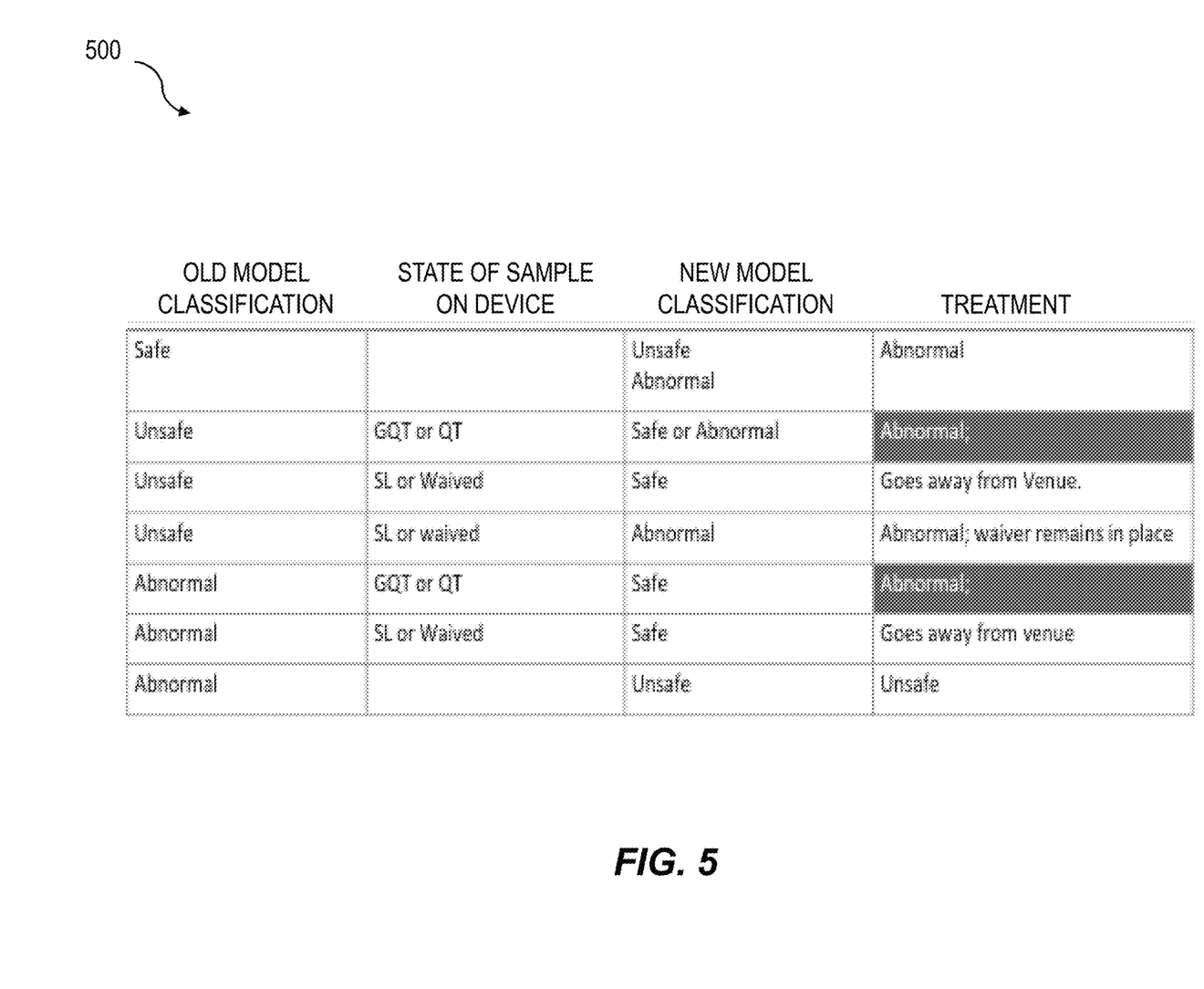
FIG. 5 shows a table illustrating features consistent with another implementation of the current subject matter.

FIG. 5 shows a table 500 illustrating features of another approach consistent with implementations of the current subject matter. In this approach, any mismatch between two model versions can result in a file being labeled as "abnormal" such that the mismatch results the file being presented for review by an administrator via a user interface provided by the administrative interface 270, even if the The table 500 shown in FIG. 5 provides example scenarios of what happens when a file status changes from the current model 240 to the new model 242. The "old model classification" column indicates how a previous model classified a given file. The "state of sample on device" column indicates whether such a file is quarantined (QT), globally quarantined (GQT), safe-listed (SL), or waived (e.g. based on evaluation by a threat assessment team and/or an administrator). The third column labeled "new model classification" indicates how a new model classifies a given file, and the final column indicates how such a file is treated.

For example, in the example of FIG. 5, a file deemed safe by the old model but unsafe or abnormal by the new model can be treated as abnormal unless there is contravening information based on a human-generated classification. A file deemed unsafe by the old model and handled on the device as GQT or QT but deemed by the new model version to be safe or abnormal can be held as abnormal (in other words, the new model classification as "potentially safer than previously thought" does not override the old model classification, particularly if the human-generated classification already had the file quarantined.

Further with regard to FIG. 5, a file deemed unsafe or abnormal by the old model but safelisted or waived as part of the human-generated classification (as noted in the "state of sample" column) but now deemed safe by the new model version can be handled in this implementation according to the human-generated classification. However, these files can be flagged for further administrator review, for example via a user interface such as that in FIG. 3. A file that is deemed unsafe by the existing (e.g. production) model version but abnormal by the new model version continues to be labeled abnormal. However, if the file had a human-generated classification of waived, safelisted, or otherwise trusted, the human-generated classification remains in place. A file deemed abnormal by the old/production model version, for which there is no sample or other human-generated classification completed, and which the new model version classifies as unsafe, remains unsafe.

Figure 6:
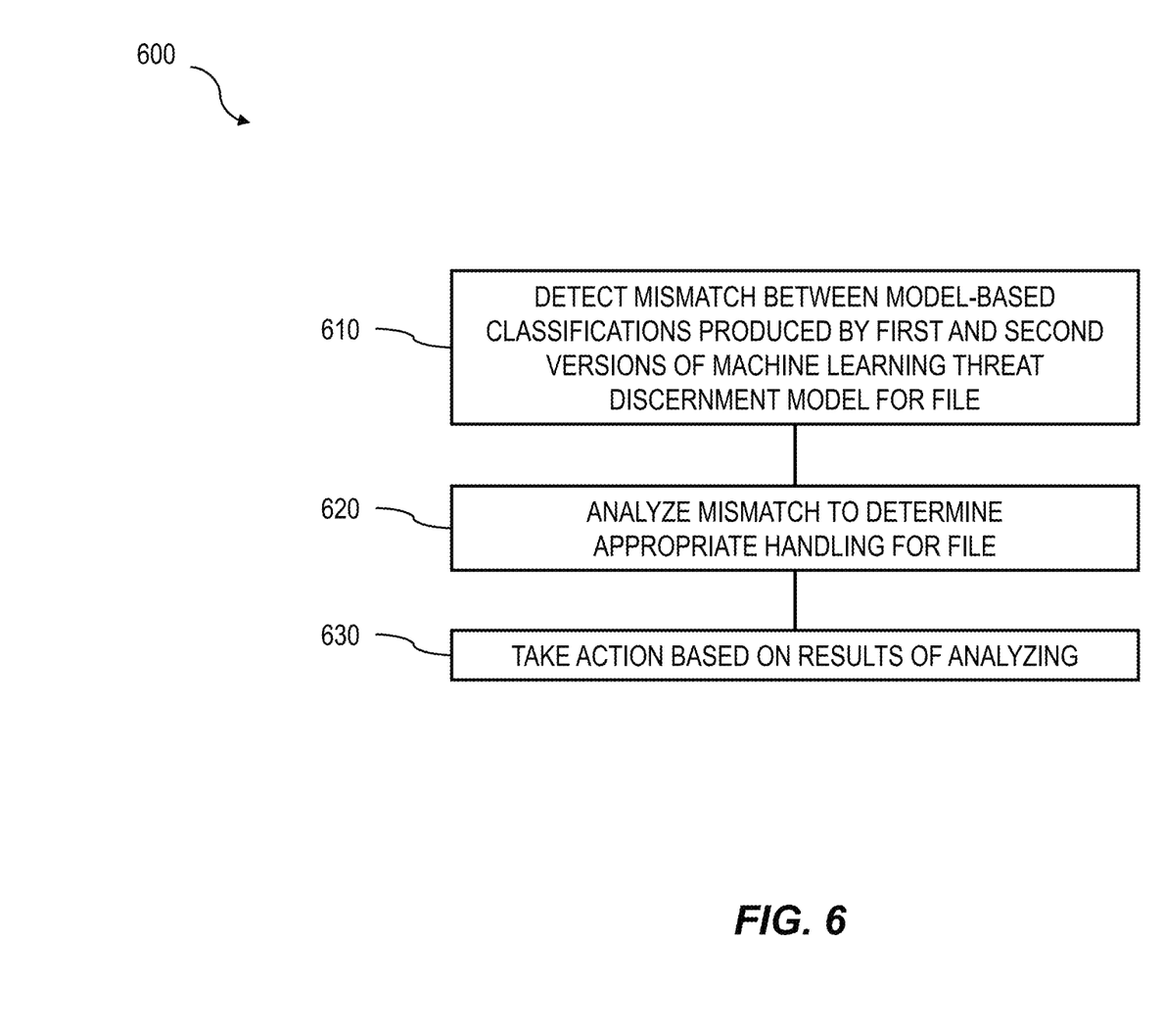
FIG. 6 shows a process flow diagram illustrating aspects of a method having one or more features consistent with implementations of the current subject matter.

FIG. 6 shows a process flow chart 600 illustrating features that can be present in a method consistent with implementations of the current subject matter. At 610, a mismatch between model-based classifications produced by a first version of a machine learning threat discernment model and a second version of a machine learning threat discernment model for a file is detected. The terms first and second are used here to refer to different versions of the machine learning threat discernment model without specifying an ordering. It will be understood that in certain implementations, the first model version is a current (e.g. production) version of the machine learning threat discernment model while the second model version is a new (e.g. to be rolled out, or partially but not yet completely rolled out) version of the machine learning threat discernment model.

At 620, the mismatch is analyzed to determine appropriate handling for the file. The appropriate handing is based on review of previously stored human classifications, e.g. safe (or white) lists, quarantine lists, waiver lists, black lists, "trusted" status, etc. As described above, the appropriate handling examines a human classification status for a file, a first model version status that reflects classification by the first version of the machine learning threat discernment model, and a second model version status that reflects classification by the second version of the machine learning threat discernment model. The human classification can be allowed to dominate when it is available.

At 630, an action is taken based on the results of the analyzing. Consistent with the implementation explained above in reference to FIG. 4, the action can include one of the following. For example, when a human-generated classification is not available, a file deemed safe by the first model version but unsafe by the second model version is presented to an administrator via user interface functionality of an administrative interface with a choice of safelisting or leaving the file as "unsafe" per the second model version by providing a sample of the file for further threat analytics. A file deemed unsafe by the first model version but safe by the new model version can be quarantined. A file with no human-generated classification that the second model version classifies as unsafe is presented to the administrator via the user interface functionality of the administrative interface with a second choice of designating the file for local analysis and/or allowing the second model version classification to continue to block use of the file until a classification becomes available.

In some implementations of the current subject matter, a new "zone" can be created into which endpoint computers at an organization send will periodically send info about ALL hashes (safe and unsafe) to the networked backend for the administrative interface. It can be possible for administrators to be able to opt into (or alternatively, opt out of) this type of data collection.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. For example, while reference is made to the use of models locally and in a cloud, the current subject matter is also applicable to arrangements in which there are multiple local models. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A method for implementation by one or more data processors forming part of at least one computing device, the method comprising:

detecting, by at least one data processor, a mismatch between model-based classifications produced by a first version of a computer-implemented machine learning threat discernment model and a second version of a computer-implemented machine learning threat discernment model for a file, each of the first version of the machine learning threat discernment model and the second version of the machine learning threat discernment model for a file output a respective threat score, wherein the mismatch is based on a difference between the threat scores;

executing or accessing, by at least one data processor, the file in response to the difference between the threat scores being below a pre-defined threshold; and analyzing, by at least one data processor, the mismatch to determine appropriate handling for the file in response to the threat score being equal to or above a pre-defined threshold including causing information relating to the mismatch to be displayed in a graphical user interface of an electronic visual display.

2. The method of claim 1 wherein:

the analyzing comprises comparing a human-generated classification for a file, a first model version status that reflects classification by the first version of the machine learning threat discernment model, and a second model version status that reflects classification by the second version of the machine learning threat discernment model, the analyzing further comprises allowing the human-generated classification to dominate when it is available; and the method further comprises: taking, by at least one data processor, an action based on the analyzing.

3. The method of claim 2, wherein the action comprises:

presenting, by at least one data processor, the file via user interface functionality of an administrative interface with a choice of creating a new human-generated classification of the file as safe or allowing the second model version classification to govern when the file is deemed safe by the first model version but unsafe by the second model version, and when the human-generated classification is unavailable for the file;

quarantining, by at least one data processor, a file deemed unsafe by the first version of the machine learning threat discernment model but safe by the second version of the machine learning threat discernment model when the human-generated classification is unavailable for the file; and presenting, by at least one data processor, the file via the user interface functionality of the administrative interface with a second choice of designating the file for local analysis and/or allowing the second model version classification to continue to block use of the file until the human-generated classification becomes available when the file is deemed unsafe by the second model version and the human human-generated classification is unavailable and when the first model version has not previously classified the file.

4. The method of claim 2, wherein the action comprises: presenting, by at least one data processor, the file via user interface functionality of an administrative interface with a choice of creating a new human-generated classification of the file as safe or allowing the second model version classification to govern when the file is deemed safe by the first model version but unsafe by the second model version, and when the human-generated classification is unavailable for the file.

5. The method of claim 2, wherein the action comprises: quarantining, by at least one data processor, a file deemed unsafe by the first version of the machine learning threat discernment model but safe by the second version of the machine learning threat discernment model when the human-generated classification is unavailable for the file.

6. The method of claim 2, wherein the action comprises: presenting, by at least one data processor, the file via user interface functionality of an administrative interface with a second choice of designating the file for local analysis and/or allowing the second model version classification to continue to block use of the file until the human-generated classification becomes available when the file is deemed unsafe by the second model version and the human human-generated classification is unavailable and when the first model version has not previously classified the file.

7. The computer-implemented method of claim 1, wherein the first version of a computer-implemented machine learning threat discernment model and the second version of a computer-implemented machine learning threat discernment model for the file are on different and remote computing systems.

8. The computer-implemented method of claim 1, wherein the first version of a computer-implemented machine learning threat discernment model and the second version of a computer-implemented machine learning threat discernment model for the file are on the same computing system.

9. A system comprising:
at least one data processor; and
memory storing instructions which, when executed by the at least one data processor, result in operations comprising:
    detecting a mismatch between model-based classifications produced by a first version of a computer-implemented machine learning threat discernment model and a second version of a computer-implemented machine learning threat discernment model for a file, each of the first version of the machine learning threat discernment model and the second version of the machine learning threat discernment model for a file output a respective threat score, wherein the mismatch is based on a difference between the threat scores;
    executing or accessing the file in response to the difference between the threat scores being below a pre-defined threshold; and
    analyzing the mismatch to determine appropriate handling for the file in response to the threat score being equal to or above a pre-defined threshold including causing information relating to the mismatch to be displayed in a graphical user interface of an electronic visual display.

10. The system of claim 9 wherein:
the analyzing comprises comparing a human-generated classification for a file, a first model version status that reflects classification by the first version of the machine learning threat discernment model, and a second model version status that reflects classification by the second version of the machine learning threat discernment model,
the analyzing further comprises allowing the human-generated classification to dominate when it is available; and
the operations further comprise: taking an action based on the analyzing.

11. The system of claim 10, wherein the action comprises: presenting the file via user interface functionality of an administrative interface with a choice of creating a new human-generated classification of the file as safe or allowing the second model version classification to govern when the file is deemed safe by the first model version but unsafe by the second model version, and when the human-generated classification is unavailable for the file;
quarantining a file deemed unsafe by the first version of the machine learning threat discernment model but safe by the second version of the machine learning threat discernment model when the human-generated classification is unavailable for the file; and
presenting the file via the user interface functionality of the administrative interface with a second choice of designating the file for local analysis and/or allowing the second model version classification to continue to block use of the file until the human-generated classification becomes available when the file is deemed unsafe by the second model version and the human human-generated classification is unavailable and when the first model version has not previously classified the file.

12. The system of claim 10, wherein the action comprises: presenting the file via user interface functionality of an administrative interface with a choice of creating a new human-generated classification of the file as safe or allowing the second model version classification to govern when the file is deemed safe by the first model version but unsafe by the second model version, and when the human-generated classification is unavailable for the file.

13. The system of claim 10, wherein the action comprises: quarantining a file deemed unsafe by the first version of the machine learning threat discernment model but safe by the second version of the machine learning threat discernment model when the human-generated classification is unavailable for the file.

14. The system of claim 10, wherein the action comprises: presenting the file via user interface functionality of an administrative interface with a second choice of designating the file for local analysis and/or allowing the second model version classification to continue to block use of the file until the human-generated classification becomes available when the file is deemed unsafe by the second model version and the human human-generated classification is unavailable and when the first model version has not previously classified the file.

15. The system of claim 10, wherein the first version of a computer-implemented machine learning threat discernment model and the second version of a computer-implemented machine learning threat discernment model for the file are on different and remote computing systems.

16. The system of claim 10, wherein the first version of a computer-implemented machine learning threat discernment model and the second version of a computer-implemented machine learning threat discernment model for the file are on the same computing system.

17. A computer program product comprising non-transitory media storing instructions which, when executed by the at least one data processor, result in operations comprising:
   detecting a mismatch between model-based classifications produced by a first version of a computer-implemented machine learning threat discernment model and a second version of a computer-implemented machine learning threat discernment model for a file, each of the first version of the machine learning threat discernment model and the second version of the machine learning threat discernment model for a file output a respective threat score, wherein the mismatch is based on a difference between the threat scores;
   executing or accessing the file in response to the difference between the threat scores being below a pre-defined threshold; and
   analyzing the mismatch to determine appropriate handling for the file in response to the threat score being equal to or above a pre-defined threshold including causing information relating to the mismatch to be displayed in a graphical user interface of an electronic visual display.

18. The computer program product of claim 17 wherein:
   the analyzing comprises comparing a human-generated classification for a file, a first model version status that reflects classification by the first version of the machine learning threat discernment model, and a second model version status that reflects classification by the second version of the machine learning threat discernment model,
   the analyzing further comprises allowing the human-generated classification to dominate when it is available; and
   the operations further comprise: taking an action based on the analyzing.

19. The computer program product of claim 18, wherein the action comprises:
   presenting the file via user interface functionality of an administrative interface with a choice of creating a new human-generated classification of the file as safe or allowing the second model version classification to govern when the file is deemed safe by the first model version but unsafe by the second model version, and when the human-generated classification is unavailable for the file;
   quarantining a file deemed unsafe by the first version of the machine learning threat discernment model but safe by the second version of the machine learning threat discernment model when the human-generated classification is unavailable for the file; and
   presenting the file via the user interface functionality of the administrative interface with a second choice of designating the file for local analysis and/or allowing the second model version classification to continue to block use of the file until the human-generated classification becomes available when the file is deemed unsafe by the second model version and the human human-generated classification is unavailable and when the first model version has not previously classified the file.

20. The computer program product of 18, wherein the action comprises:
   presenting the file via user interface functionality of an administrative interface with a choice of creating a new human-generated classification of the file as safe or allowing the second model version classification to govern when the file is deemed safe by the first model version but unsafe by the second model version, and when the human-generated classification is unavailable for the file.

* * * * *